United States Patent
Christiansen et al.

(10) Patent No.: US 7,576,878 B2
(45) Date of Patent: Aug. 18, 2009

(54) ENHANCED MANAGEMENT OF RASTER IMAGE PROCESSING RESOURCES

(75) Inventors: Robert D. Christiansen, Boise, ID (US); Paul R. Wissenbach, Boise, ID (US); Scott C. Clouthier, Boise, ID (US); Brian E. Hoffmann, Boise, ID (US); Robert E. Stevahn, Jr., Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1233 days.

(21) Appl. No.: 10/406,357

(22) Filed: Apr. 3, 2003

(65) Prior Publication Data

US 2004/0196493 A1 Oct. 7, 2004

(51) Int. Cl.
- H04N 1/00 (2006.01)
- H04N 1/333 (2006.01)
- H04N 1/40 (2006.01)
- G06F 3/12 (2006.01)
- G06F 15/163 (2006.01)
- G06F 15/82 (2006.01)
- G06K 1/00 (2006.01)

(52) U.S. Cl. .............. 358/1.15; 358/400; 358/1.1; 358/1.13

(58) Field of Classification Search .............. None
See application file for complete search history.

(56) References Cited

U.S. PATENT DOCUMENTS

| | | | | |
|---|---|---|---|---|
| 4,843,571 A * | 6/1989 | Notermans et al. | ........ | 358/1.18 |
| 5,075,874 A * | 12/1991 | Steeves et al. | ........ | 358/1.13 |
| 5,113,494 A * | 5/1992 | Menendez et al. | ........ | 345/502 |
| 5,206,735 A * | 4/1993 | Gauronski et al. | ........ | 358/296 |
| 5,579,447 A * | 11/1996 | Salgado | ........ | 358/1.9 |
| 5,603,054 A * | 2/1997 | Theimer et al. | ........ | 710/6 |
| 5,754,744 A * | 5/1998 | Matsumoto et al. | ........ | 358/1.13 |
| 5,910,582 A * | 6/1999 | Elliott et al. | ........ | 536/23.5 |
| 6,058,277 A * | 5/2000 | Streefkerk et al. | ........ | 399/81 |
| 6,125,249 A * | 9/2000 | Ootsuka et al. | ........ | 399/87 |
| 6,327,044 B1 * | 12/2001 | Shima | ........ | 358/1.15 |
| 6,327,050 B1 * | 12/2001 | Motamed et al. | ........ | 358/1.18 |
| 6,463,229 B2 * | 10/2002 | Takuwa et al. | ........ | 399/82 |
| 6,559,958 B2 * | 5/2003 | Motamed et al. | ........ | 358/1.13 |
| 6,785,727 B1 * | 8/2004 | Yamazaki | ........ | 709/229 |
| 6,825,943 B1 * | 11/2004 | Barry et al. | ........ | 358/1.15 |
| 6,879,409 B2 * | 4/2005 | Motamed et al. | ........ | 358/1.13 |
| 6,981,254 B2 * | 12/2005 | Parry | ........ | 718/100 |
| 6,986,136 B2 * | 1/2006 | Simpson et al. | ........ | 718/102 |
| 7,072,053 B2 * | 7/2006 | Guddanti | ........ | 358/1.13 |
| 7,093,252 B1 * | 8/2006 | Lam | ........ | 718/102 |
| 7,145,678 B2 * | 12/2006 | Simpson et al. | ........ | 358/1.15 |
| 7,206,532 B2 * | 4/2007 | Lofthus et al. | ........ | 399/84 |

(Continued)

FOREIGN PATENT DOCUMENTS

EP 468762 A2 * 1/1992

*Primary Examiner*—Twyler L Haskins
*Assistant Examiner*—Myles D Robinson

(57) ABSTRACT

Systems, apparatus, and methods for enhancing management of raster image processing (RIP) resources are described. In one aspect, a printing environment includes a RIP engine and multiple RIP pipelines. The RIP engine is scheduled to perform RIP for a first time period for a first pipeline of the multiple RIP pipelines. Responsive to occurrence of a start time of the first time period, the RIP engine is automatically transferred to the first pipeline for RIP.

22 Claims, 4 Drawing Sheets

U.S. PATENT DOCUMENTS

| | | | |
|---|---|---|---|
| 7,262,876 B2 * | 8/2007 | Wei et al. | 358/1.15 |
| 7,298,503 B2 * | 11/2007 | Christiansen et al. | 358/1.13 |
| 7,305,449 B2 * | 12/2007 | Simpson et al. | 709/207 |
| 7,385,714 B2 * | 6/2008 | Christiansen | 358/1.13 |
| 2003/0011811 A1 * | 1/2003 | Clough | 358/1.15 |
| 2003/0208607 A1 * | 11/2003 | Yamazaki | 709/229 |
| 2004/0119997 A1 * | 6/2004 | Christiansen | 358/1.13 |
| 2004/0179218 A1 * | 9/2004 | Wissenbach | 358/1.13 |
| 2004/0184061 A1 * | 9/2004 | Christiansen | 358/1.13 |
| 2004/0196470 A1 * | 10/2004 | Christiansen | 358/1.1 |
| 2004/0207863 A1 * | 10/2004 | Christiansen | 358/1.13 |
| 2005/0015779 A1 * | 1/2005 | Christiansen | 719/327 |
| 2005/0094175 A1 * | 5/2005 | Christiansen et al. | 358/1.13 |
| 2005/0094194 A1 * | 5/2005 | Dolev et al. | 358/1.15 |

* cited by examiner

ENHANCED MANAGEMENT OF RASTER IMAGE PROCESSING RESOURCES

RELATED APPLICATIONS

This patent application is related to U.S. patent application Ser. No. 10/322,021, titled "PARTITIONING OF PRINT JOBS FOR RASTER IMAGE PROCESSING", filed on Dec. 17, 2002, commonly assigned herewith, and hereby incorporated by reference.

TECHNICAL FIELD

The invention relates to the printing field. In particular, the invention pertains to configuring a raster image processing pipeline with necessary processing resources to meet print shop workflow needs.

BACKGROUND

Raster image processing (RIP) is the process of translating digital image data into bit-mapped device-ready data or raster bits for rendering. Such image data is generally embodied in one of a number of different page description languages (PDLs) such as Printer Control Language (PCL)®, Portable Document Format (PDF)®, or PostScript (PS)® but can also appear as stand-alone images such as JPEG or TIFF files. In the printing field, RIP is commonly used by print shops to print jobs or documents on a printing press. To this end, print shop administers must generally configure RIP resources to RIP PCL, PS, or PDF documents as well as JPEG, TIFF, or EPS images. A RIP resource can be implemented in hardware or software.

One or more RIP resources configured to work on a particular print job can be referred to as a pipeline. When a pipeline consists of multiple RIP resources, the respective resources may be implemented across any number of computing devices. A pipeline may be configured to RIP documents of more than a single print data type at a time but are typically configured to RIP a single print data type at a time. Configuring and reconfiguring RIP resources across various pipelines can be a common activity in print shop environments. This is because print shop workflows can change from hour-to-hour, day-to-day, and so on.

For example, a print shop may need to process a large PDF print job in the morning, a number of PS print jobs in the afternoon, and a number of PCL print jobs during the night. Moreover, while large numbers of PDF jobs are being processed, there may be a few other jobs that still need to be processed in parallel. In this example, all or some amount of the total available RIP resources need to be assigned to a pipeline in the morning to RIP the large PDF job, some amount of the available RIP resources need to be assigned to a pipeline in the afternoon to RIP the PS jobs, and some amount of the available RIP resources need to be assigned to a pipeline at night to RIP each of the PCL jobs. In any one of these scenarios, the actual amount of RIP power that is required by any one pipeline is a function not only of the total amount or RIP resources that are available at that time, but also a function of numerous other criteria. Such criteria include, for example, the respective print job sizes, speed at which the print jobs need to be processed, current RIP projects, anticipated and unanticipated print shop workflow, and so on.

Unfortunately, configuring pipelines with RIP resources can be a time consuming and laborious process that can substantially impede print shop throughput. For example, it is common for printing presses to sit idle until such pipeline configuration is complete. In view of this, systems and techniques to configure/reconfigure pipelines with appropriate RIP resources in an efficient manner are greatly desired to enhance print shop workflow.

SUMMARY

Systems, apparatus, and methods for enhancing management of raster image processing (RIP) resources are described. In one aspect, a printing environment includes a RIP engine and multiple RIP pipelines. The RIP engine is scheduled to perform RIP for a first time period for a first pipeline of the multiple RIP pipelines. Responsive to occurrence of a start time of the first time period, the RIP engine is automatically transferred to the first pipeline for RIP.

BRIEF DESCRIPTION OF THE DRAWINGS

The following detailed description is described with reference to the accompanying figures. In the figures, the left-most digit(s) of a reference number identifies the figure ("Fig.") in which the reference number first appears.

DETAILED DESCRIPTION

Figure 1:
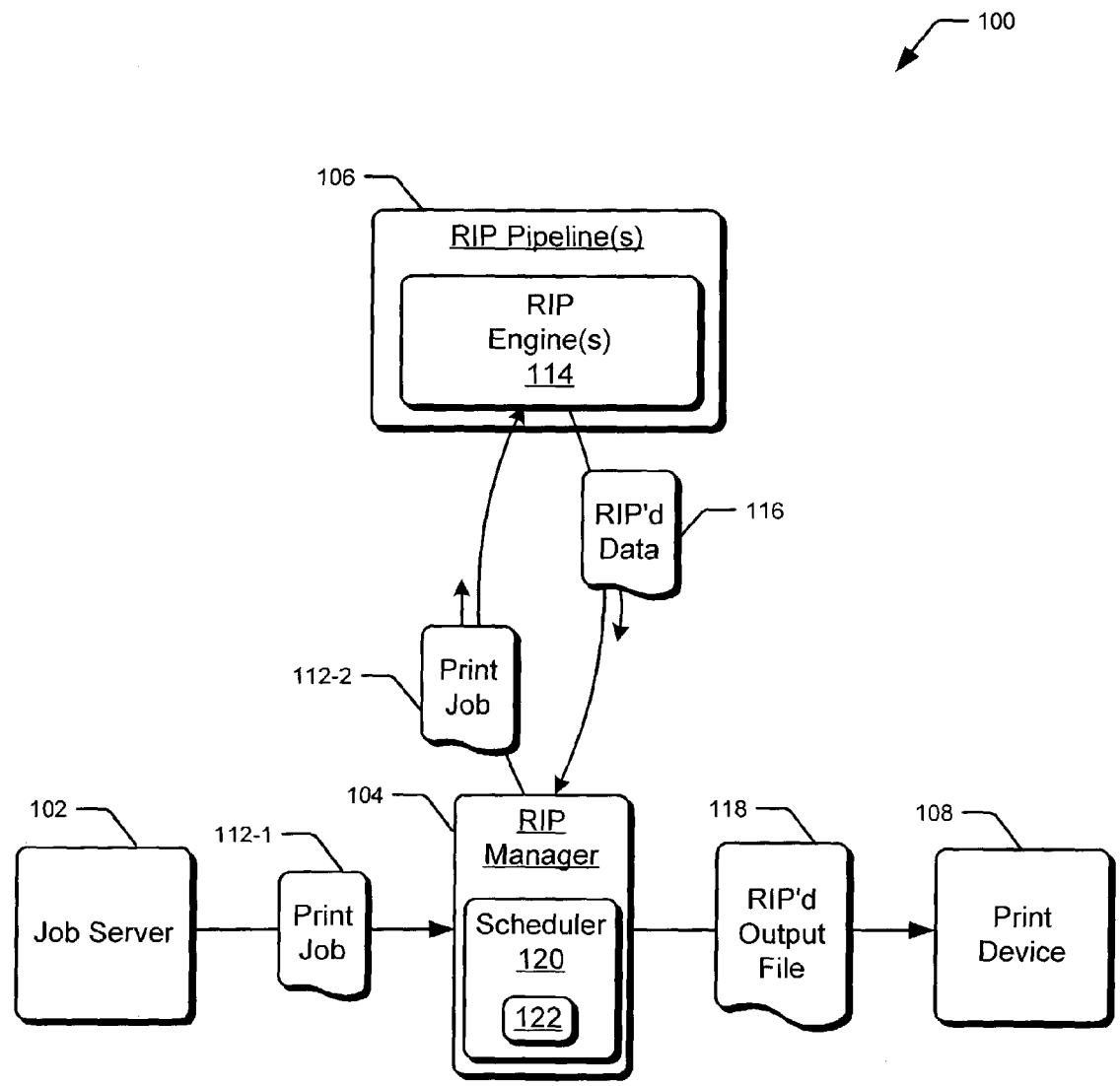
FIG. 1 is an exemplary embodiment of a suitable computing environment within which systems, apparatuses and methods to enhance management of RIP resources may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Program modules generally include routines, programs, objects, components, data structures, etc., that perform particular tasks or implement particular abstract data types. In a distributed computing environment, program modules may be located in both local and remote memory storage devices.

FIG. 1 is an exemplary suitable computing environment 100 within which systems, apparatuses and methods to enhance management of RIP resources may be implemented. Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

As shown in FIG. 1, the exemplary computing environment 100 allows print shop administrators to implement flexible and extensible print shop business models to enhance management of RIP resources. In particular, cooperative components of the exemplary computing environment allow an administrator to define a schedule with respect to time for automatic assignment at specified times of RIP resources to a RIP pipeline. The schedule is defined in advance to meet anticipated RIP resource needs, or defined in real-time as unanticipated print shop workflow is encountered. The schedule is continuously evaluated by an automated RIP manager and dynamically enforced to distribute RIP resources across specified ones of the RIP pipelines. Such cooperative components include, for example, job server 102, RIP manager 104, one or more RIP pipelines 106, and print device 108, each of which are now described.

Job server 102 receives, uploads, or otherwise accesses print job 112-1 from data source(s) internal or external (e.g., a client coupled to the computing environment over the Internet) to the computing environment. Each print job represents a document expressed in one of multiple possible page description language (PDL) data formats. Each print job includes, for example, text, layout instructions, and assets such as fonts and embedded images.

Job server 102 applies or otherwise communicates print job 112-1 to RIP manager 104. The RIP manager queues respective print jobs and directs the print job pages to a particular RIP pipeline 106. For purposes of discussion, print job 112-1 is also represented as print job 112-2 to illustrate the print job being directed by the RIP manager to the particular pipeline. The particular pipeline selected to RIP the print job is a function of multiple criteria such as the specific PDL type used to express the image data in the print job, print job sizes, available RIP resources, current print job workflow, and so on.

Each RIP pipeline 106 includes zero (0) or more RIP engines 114 for translating or "ripping" the image data expressed in the print job into device-ready RIP'd data 116. When a pipeline is configured with 0 RIP engines, print job(s) will be queued waiting for RIP resources to be assigned to the pipeline. Each RIP engine 114 in a particular pipeline 106 can process a portion of print job 112 in parallel, or at least in combination, with the other RIP engines in the pipeline. The RIP manager communicates the RIP'd data as RIP'd output file 118 for printing at print device 108.

To enhance management of RIP resources, RIP manager 104 includes scheduler 120, which automatically configures respective pipelines 106 with individual ones of the RIP engine(s) 114. Such automatic configuration is performed according to time-based and other default criteria specified in RIP resource schedule 122. In particular, an administrative entity configures the scheduler to automatically assign specific ones of the RIP engine(s) to particular ones of the pipeline(s) to meet anticipated print job workflow, to make best use of available RIP resources (i.e., RIP engines 114), printing resources, and so on. Transferring a RIP engine resource is simply a matter of 1) requesting the transfer, 2) wait for the RIP engine to become idle, and 3) move the RIP engine's internal representation from one pipeline's list to another pipeline's list.

For example, scheduler 120 can schedule a specific RIP engine 114 to automatically participate in: a first RIP pipeline 106 that processes only PDF print jobs for part of the day, a second RIP pipeline 106 that processes TIFF print jobs in the afternoon, and an entirely different pipeline 106 that processes PS print jobs at night.

Scheduler 120 allows an administrative entity to use multiple scheduling criteria to configure RIP resource schedule 122 for automated RIP manager 104 assignment of a RIP engine 114 to any number of defined pipelines. The RIP resource schedule is archived for subsequent automatic implementation, by the RIP manager, of specified RIP resource distribution across indicated RIP pipelines. An archived RIP resource schedule specifies at least a first time period for a RIP engine to perform a RIP operation in a first pipeline of multiple RIP pipelines.

For example, in one implementation, the scheduler sets up RIP resource schedules on a daily, weekly, monthly, or yearly basis. Such scheduling may correspond to anticipated print job workflow. For instance, a particular pipeline may be configured with specific RIP resources (i.e., RIP engines) to RIP end of the month financial reports, to RIP Tax forms in April, and so on.

Scheduler 120 allows an administrative entity to specify a respective default pipeline 106 for each of the RIP engines 114. If a RIP engine has a default pipeline assigned to it, the RIP manager 104 will automatically transfer the RIP engine to the default pipeline responsive to positive evaluation of any one of multiple criteria. Such criteria and positive evaluations are based, for example, on the following: determining that the RIP Engine has been idle for a threshold amount of time in a current pipeline 106 other than the default pipeline, or determining that subsequent to completing ripping activities in a current pipeline 106 other than the default pipeline, that the RIP engine is not scheduled for ripping activities in any other pipeline 106, and so on. The RIP Manager knows how long a RIP engine has been idle. If a RIP engine was idle for some period of time, the RIP manager can trigger the transfer of the RIP engine back to the default pipeline from the current pipeline. When the scheduler transfers a RIP engine from the default pipeline to the currently scheduled pipeline, a timer would be set for the desired activity period. Once this timer had expired, the scheduler would then initiate the transfer steps to return the RIP engine to the default pipeline. This default pipeline feature of the scheduler allows the administrative entity with further automatically implemented control of the management of RIP resources in a print shop.

Figure 2:
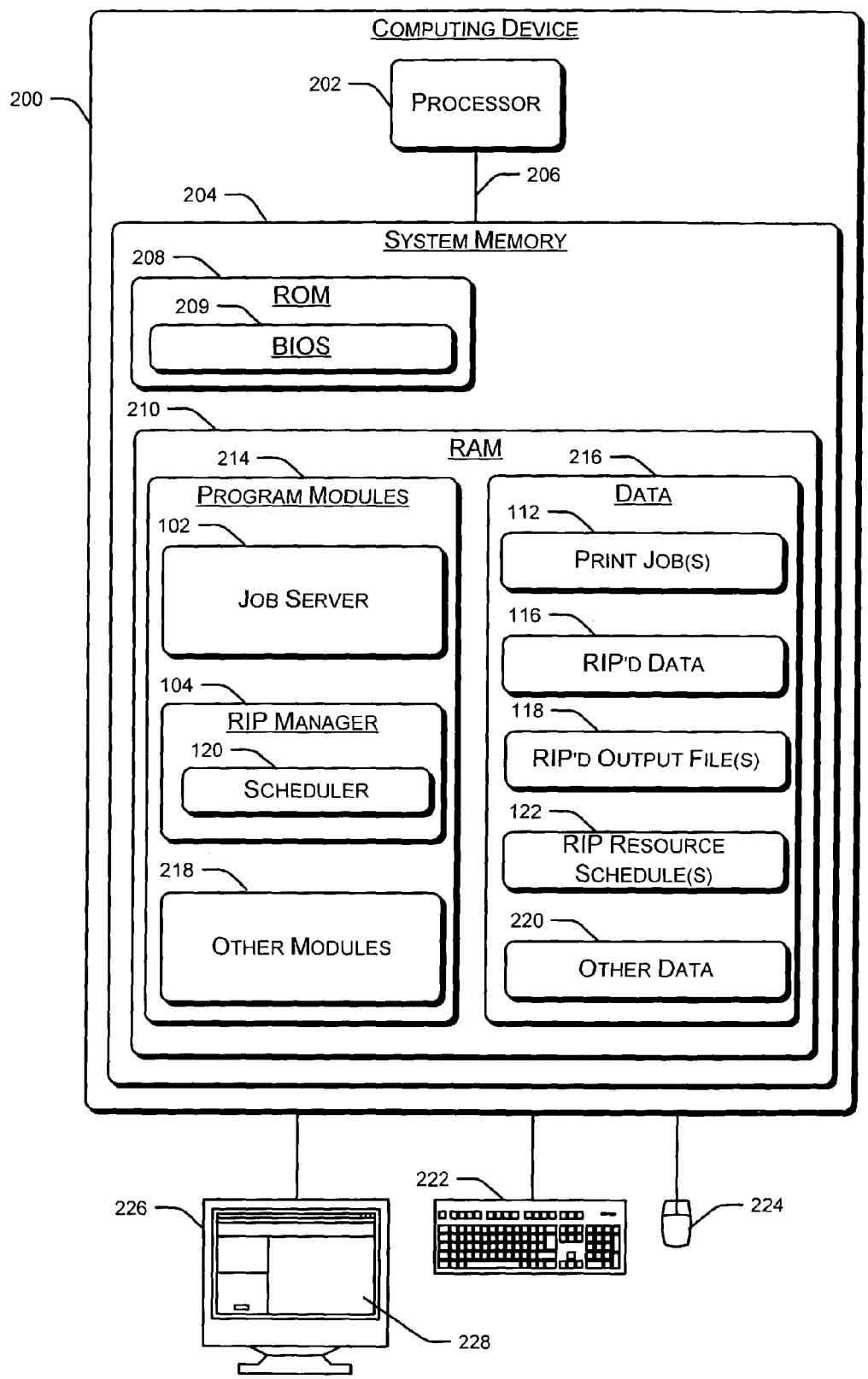
FIG. 2 shows an exemplary embodiment of computer system to enhance management of RIP resources.

In one implementation, default pipelines 106 for respective RIP engines 114 are identified in RIP resource schedule 122, or in a configuration data portion of "other data" 220 of FIG. 2.

Moreover, pipelines 106 may be assigned priorities. (For purposes of discussion such priorities are represented in a pipeline configuration data portion of "other data" 220 of FIG. 2). In light of this, if the scheduler 120 identifies a scheduling conflict between a first and a second pipeline, the scheduler 120 will automatically preempt the schedule associated with the lower priority pipeline in favor of the higher priority pipeline's schedule. In one implementation, the scheduler generates a message for display by the RIP manager indicating the specifics of such a priority-based schedule override.

FIG. 2 shows an exemplary computer system 200 to enhance management of RIP resources. The components of computer 200 may include one or more processors or processing units 202, system memory 204, and bus 206 that couples various system components including the system memory to the processor. Bus 206 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 200 typically includes a variety of computer readable media. Such media may be any available media that is accessible by computer 200, and it includes both volatile and non-volatile media, removable and non-removable media. In FIG. 2, system memory 204 includes computer readable media in the form non-volatile memory, such as read-only memory (ROM) 208, and/or volatile memory, such as random access memory (RAM) 210. A basic input/output system (BIOS) 209 contains basic routines that help to transfer information between elements within computer 200, such as during start-up, is stored in ROM 208. Computer 200 may further include other removable/non-removable, volatile/non-volatile computer storage media such as a hard disk drive, a CD-ROM, a magnetic tape drive, and so on.

RAM 210 contains program modules 214 and data 216 that are immediately accessible to and/or presently being operated on by the processor 202. For purposes of discussion, such program modules and data are described in reference to components 102 through 122 of FIG. 1 (the first digit of the reference number indicates the drawing in which the particular component was originally described). In particular, program modules 214 includes job server 102, RIP manager 104, and other modules 218 such as a print job preprocessor to analyze a print job 112, an operating system (OS) to provide a runtime environment, and so on. Data portion 216 of RAM 210 includes, for example, one or more print jobs 112, RIP'd data 116, RIP'd output file(s) 118, RIP resource schedule(s) 122, and other data 220 such as scheduling user interface (UI) data, pipeline configuration data (e.g., RIP engine default pipeline identifiers), and so on.

A user may provide commands and information into computer 200 through input devices such as keyboard 222 and pointing device 224 (such as a "mouse"). Other input devices (not shown) may include a microphone, joystick, game pad, satellite dish, serial port, scanner, camera, etc. These and other input devices are connected to the processing unit 202 through a user input interface (not shown) that is coupled to bus 206, but may be connected by other interface and bus structures, such as a parallel port, game port, a universal serial bus (USB), Firewire (IEEE 1394), and/or the like.

A monitor 226 or other type of display device is also connected to bus 206 via an interface, such as a video adapter (not shown). An administrative entity may define RIP engine 114 (FIG. 1) scheduling rules for automatically assigning RIP resources to respective pipeline(s) 106 (FIG. 1) by interfacing with user interface (UI) 228 presented via the monitor, voice activated interfaces, the described input devices, or the like. The user interface is presented to the administrative entity by scheduler 120. The UI allows a user to configure pipelines 106 (FIG. 1) with respective RIP resources (i.e., RIP engines 114 of FIG. 1) according to customized, flexible, and extensible RIP resource schedule(s) 122 (FIGS. 1 and 2).

Figure 3:
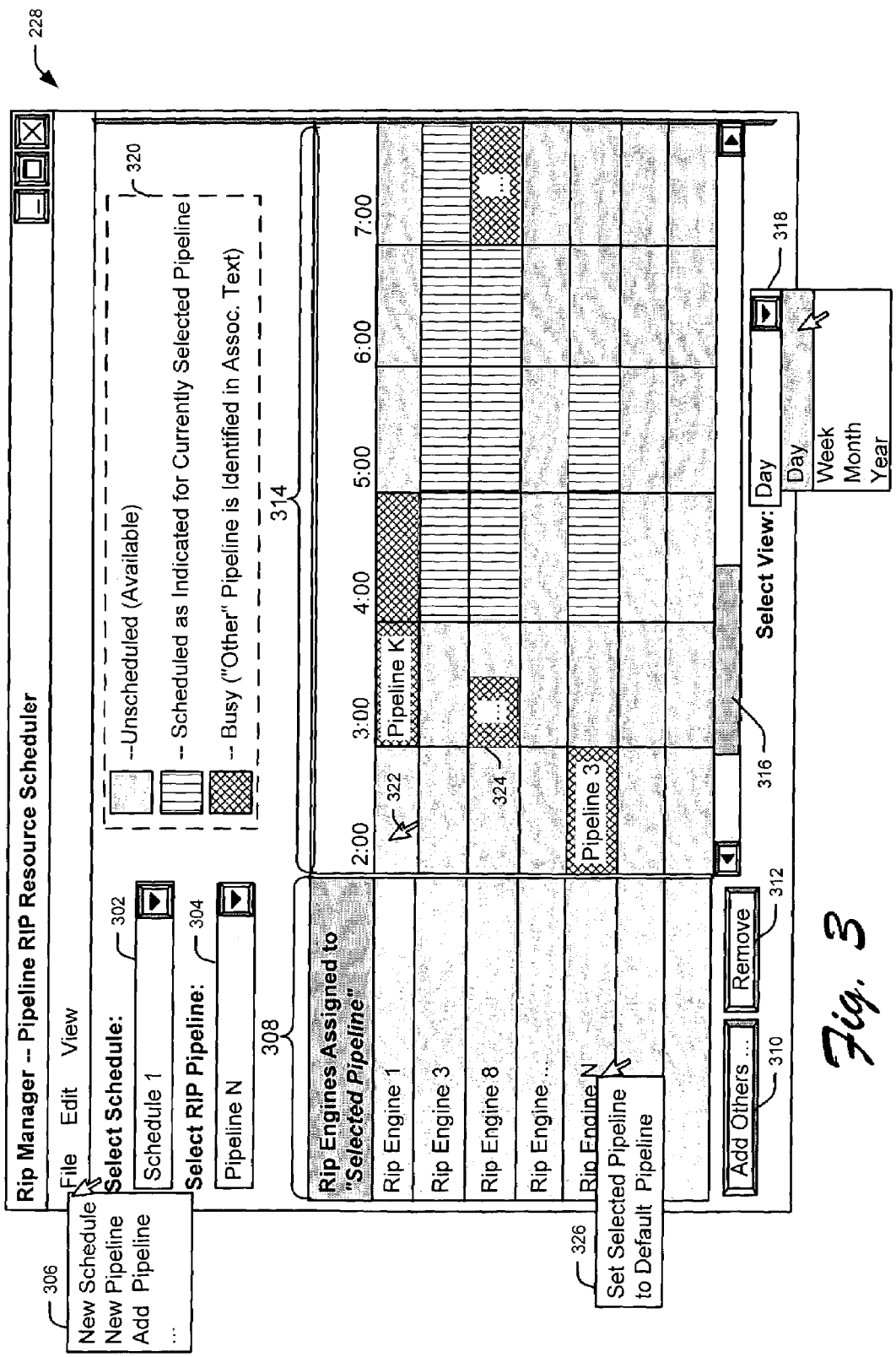
FIG. 3 shows an exemplary embodiment of a user interface for enhancing management of RIP resources.

FIG. 3 shows an exemplary user interface (UI) 228 of FIG. 2 for enhancing management of RIP resources. UI 228 allows a user to configure pipelines 106 (FIG. 1) with respective RIP engines 114 (FIG. 1) according to any number of RIP resource schedules 122 (FIGS. 1 and 2). A number of UI control components such as text, labels, dropdown menus, scroll bars and lists, and so on, are described below with respect to UI 228. Although specific titles, text, control positioning, and overall layout of UI 228 are described, UI 228 of FIG. 3 is only one possible implementation of the "RIP Manager—Pipeline Resource Scheduler". Thus, different titles, labels, UI controls, layout, and so on can be used to implement the following described features of UI 228. For purposes of discussion, the components of UI 228 (i.e., UI controls) are described in reference to various components of FIGS. 1 and 2.

In this exemplary implementation, UI 228 includes multiple UI controls. Such controls include, for example: file menu 306, select schedule menu 302, select pipeline menu 304, "RIP Engines Assigned to the 'Selected Pipeline'" list box 308, button controls 310 and 312, RIP engine scheduling control area 314, scrollbar control 316, select view menu 318, and legend 320. Each of these UI components and their functionality are now described.

Select schedule menu 302, which in this implementation is a drop-down menu, allows a user to select a particular RIP resource schedule 122 (FIG. 1) of any possible number of schedules with which to work. Although only one schedule is shown in this example ("schedule 1"), the interactive arrow control feature at the right of the dropdown menu 302 allows for the display and selection of individual ones of multiple schedules.

Responsive to selecting a RIP resource schedule 122 (FIGS. 1 and 2) via dropdown menu 302, "Select RIP Pipeline" dropdown menu 304 is populated with zero (0) or more pipelines 106 (FIG. 1) for display and user selection. The number of pipelines that are actually presented in the "Select RIP Pipeline" menu 304 is a function of the number of pipelines that have been previously created with respect to, or added to the selected schedule, which in this example is "Schedule 1". In this example, "Pipeline N" corresponds to a pipeline selected by a user or selected by scheduler 120 (FIG. 1) by default. Although FIG. 3 shows only one pipeline ("Pipeline N"), the arrow control feature at the right of the Select RIP Pipeline" dropdown menu 304 allows for the display and selection of individual ones of multiple pipeline names that have been added to the selected schedule.

File menu 306 is used to create/add new RIP resource schedules 122 (FIGS. 1 and 2) and pipelines 106 (FIG. 1) within a selected RIP resource schedule. When an administrator creates a RIP resource schedule, the schedule is provided with a substantially unique name as compared to any other schedules. When the administrator adds a pipeline to a particular RIP resource schedule, the pipeline already has a substantially unique name with respect to other pipelines within the particular RIP resource schedule. This multiple scheduling scheme provides for substantial flexibility in assigning RIP resources across pipelines to meet changing print job workflow demands.

In this exemplary implementation, there are numerous ways to delete a RIP resource schedule 122 (FIGS. 1 and 2) and/or to remove a pipeline 106 (FIG. 1) from a selected schedule. Schedules and pipelines that have been deleted (removed) are not displayed in respective UI controls 302 and 304. For example, such operations can be performed via the edit menu, button controls such as the "Add Others . . . " 310 and "Remove" 312 button controls, keyboard controls 222 (FIG. 2), context sensitive popup menus (not shown) displayed over a corresponding schedule or pipeline, etc.

Responsive to selection of a pipeline from the "Select RIP Pipeline" dropdown menu 304, "RIP Engine . . . " list control 308 is populated with the specific names of the RIP engines 114 (FIG. 1) associated with the pipeline. In this example, list box shows that RIP Engines 1, 3, 8, . . . , and N have already been added to "Pipeline N". In this implementation, the "Add Others . . . " button control 310 allows a user to add another RIP engine, if available, to the selected pipeline. The "Remove" button control 312 allows for removal of a RIP engine from the list control 308, and thereby from the specified pipeline.

Responsive to selection of a pipeline from the "Select RIP Pipeline" dropdown menu 304, RIP engine scheduling control area 314 is populated with the specific schedules that apply to each of the RIP engines 114 (FIG. 1) identified in the "RIP Engine . . . " list control 308. A RIP engine's corresponding pipeline assignment schedule is specified directly across (i.e., in the same row) from the listed RIP engine. In this exemplary implementation, the RIP engine scheduling control area 314 shows RIP engine schedules with respect to a daily view. The particular time increments selected for use in the daily view is a user configurable parameter. Thus, the daily schedule of RIP engine pipeline assignments could also be presented, for example, with respect to fifteen (15) minute increments, one-half hour time increments, and so on.

Scroll bar control 316 allows the user to scroll the contents of the scheduling control area 314. For instance, in this example, to view RIP Engine schedule that are earlier than 2:00 am (the times are shown in military time but could also be shown using a twelve (12) hour designation), the user will move the thumb control in the scroll bar to the left. To view RIP Engine schedule that are later than 7:00 am, the user will move the thumb control in the scroll bar to the right.

Select view dropdown menu 318 allows a user to change the way that the information in the RIP engine scheduling control area 314 is displayed. For example, rather than displaying RIP engine 114 (FIG. 1) processing schedules with respect to a daily as shown in FIG. 3, weekly, monthly, yearly, and/or other types of views can be used to view the schedules.

Legend 320 contains explanatory information for a user to interpret information displayed in the RIP engine scheduling control area 314. In this exemplary implementation, unscheduled time is represented with a first pattern/color. A pattern may be the absence or presence of pattern. A color may be the absence or presence of color. Scheduled time is shown in a second color/pattern when a RIP engine 114 (FIG. 1) is scheduled for processing in the selected pipeline 106 (FIG. 1). Busy time is shown in a third color/pattern when a RIP engine is scheduled for processing in a pipeline other than the selected pipeline. When scheduled time belongs to a pipeline other than the selected pipeline, the name of the other pipeline is displayed within the scheduled time slot or represented with ellipses when there is not enough display area. A popup text box could display the entire name if the user hovers their mouse cursor over the truncated name on the screen.

In this implementation an unscheduled time slot, for example, the one (1) hour 2:00 time slot for "RIP Engine 1" can be assigned to selected pipeline in multiple different ways. For example, positioning a cursor (e.g., cursor 322) over an unscheduled time slot and double-clicking automatically assigns the time slot to the selected pipeline, which in this example is "pipeline N". Other ways to assign/modify portions of one, two, or multiple time slots include selecting and dragging the edge of a scheduled time slot horizontally to the left or to the right to indicate the time-period or schedule desired. In this example, a scheduled time slot can be modified with respect to either the selected pipeline or to a different pipeline. Such an edge is represented by edge 324 of the 3:00 to 3:30 time slot that "RIP Engine 8" is scheduled for processing in a pipeline other than the selected pipeline. Other methods include, for example, display of a dialog box (not shown) allowing the user to select start and stop times. Such a dialog box can be displayed in multiple different ways, for example, responsive to context sensitive popup menu item selection over one or more desired time slots, and so on.

Context sensitive popup menu 326 is positioned over a RIP engine identifier in list box 308. Such a context menu allows a user to indicate that the selected pipeline 106 (FIG. 1) will be the default pipeline for the corresponding RIP engine 114 (FIG. 1). In this example, the selected pipeline is "Pipeline N" and the corresponding RIP engine is "RIP Engine N". This feature allows the user to schedule the RIP engine for automatic transfer by RIP manager 104 (FIG. 1) to the default pipeline when the RIP engine has been idle in another pipeline for a threshold amount of time, or when the RIP engine has completed processing in a particular pipeline other than the default pipeline and is not immediately scheduled for transfer to another pipeline that is not the default pipeline.

Responsive to user selection of the "Set Selected Pipeline to Default Pipeline" menu item 326, all unscheduled time slots for the corresponding RIP engine 114 (FIG. 1) are assigned to the selected pipeline 106 (FIG. 1). In this implementation, if the corresponding RIP engine is subsequently scheduled to another pipeline during a time slot that overlaps the time slot(s) assigned to the RIP engine as "default times", the default times will be overridden. It can be appreciated that other behaviors could be implemented responsive to such an action. For example, depending on the specific interface desired, scheduler 120 (FIG. 1) could also display a popup window or dialog box notifying the user of the time slot conflict and requesting confirmation, etc.

Figure 4:
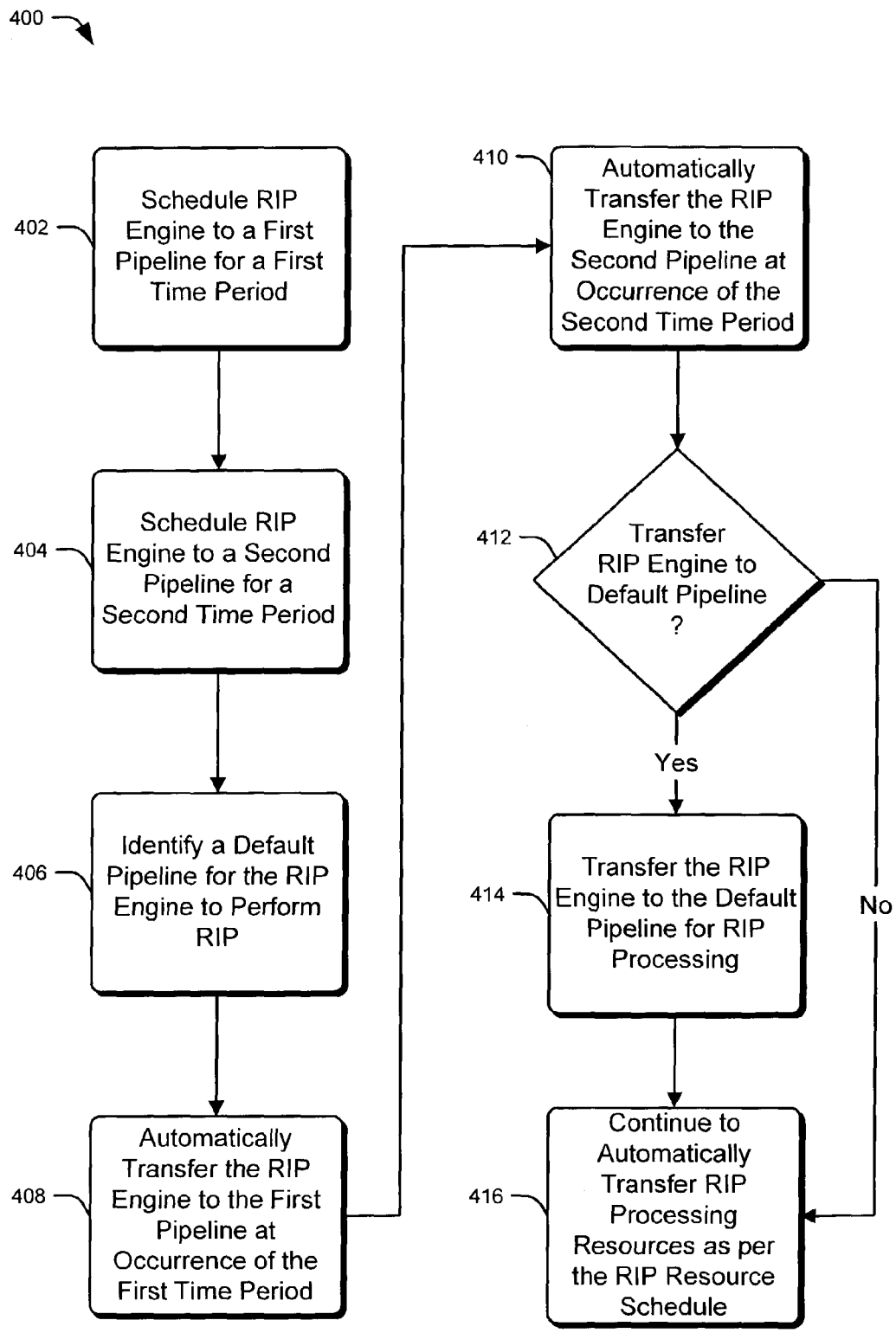
FIG. 4 shows an exemplary implementation of a procedure to enhance management of RIP resources. In particular, the exemplary procedure allows an administrative entity to assign RIP resources to specific pipelines according to a schedule that is dynamically enforced by an automated RIP manager.

FIG. 4 shows an exemplary procedure 400 to enhance management of RIP resources. For purposes of discussion, the exemplary procedure is described in reference to various components of FIGS. 1-3. In particular, the exemplary procedure allows an administrative entity to schedule RIP resources (i.e., RIP engine(s) 114 of FIG. 1) to specific pipelines 106 (FIG. 1) according to a RIP resource schedule 122 (FIGS. 1 and 2) that is automatically enforced by a RIP manager 104 (FIG. 1).

At block 402, RIP resource scheduler 120 (FIG. 1) presents user interface 228 (FIG. 2) for a user to schedule a RIP engine 114 (FIG. 1) to a first pipeline 106 (FIG. 1) for a first time period. As noted above, time periods can be expressed in a number of different ways such as on a daily, weekly, monthly, or yearly. At block 404, the users schedules the RIP engine to a second pipeline 106 (FIG. 1) for a second time period. At block 406, the user identifies or specifies a default pipeline 106 (FIG. 1) for the RIP engine to perform RIP when no longer scheduled for RIP in any other pipeline.

At block 408, the RIP manager 104 (FIG. 1) automatically transfers the RIP engine to the first pipeline responsive to the occurrence of a start time corresponding to the first time period. At block 410, the RIP manager automatically transfers the RIP engine to the second pipeline responsive to occurrence of a start time corresponding to the second time period. There is no overlap or conflict between the first and second time periods. Pipeline assignment schedules for the RIP engine are stored in RIP resource schedule 122 (FIG. 1).

At block 412, the RIP manager 104 (FIG. 1) determines according to any one or more of a number of criteria whether the RIP engine 114 (FIG. 1) should be transferred to a default pipeline. Such criteria includes, for example, transferring the RIP engine to the default pipeline if the RIP engine has been idle for a threshold amount of time in a pipeline that is not the default pipeline. Such criteria further includes, for example, transferring the RIP engine to the default pipeline if the RIP engine when the RIP engine has recently completed processing for a pipeline other than a default pipeline and is not immediately assigned to another pipeline other than the default pipeline for processing. Responsive to determining that the RIP engine that one or more of such criteria has been met, at block 414, the RIP manager transfers the RIP engine to the default pipeline. Processing continues at block 416 wherein the RIP manager continues to assign RIP resources as indicated in the RIP resource schedule 122 (FIG. 1).

CONCLUSION

The described systems and methods enhance management of RIP resources by automatically enforcing assignment of RIP resources to RIP pipelines according to a schedule. This allows print shop administrators to implement flexible and extensible print shop business models that enhance management of RIP resources. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. In a printing environment including a raster image processor (RIP) engine and multiple RIP pipelines, a method for enhancing management of RIP resources, the method comprising:
   scheduling the RIP engine to perform RIP for a first time period for a first pipeline of the multiple RIP pipelines, wherein scheduling of the RIP engine is configurable by a user to define a schedule for automatic assignment at specified times of the RIP engine to various RIP pipelines; and
   responsive to occurrence of a start time of the first time period, automatically transferring the RIP engine from a different pipeline of the multiple RIP pipelines to the first pipeline for RIP.

2. A method as recited in claim 1, wherein scheduling the RIP engine to perform RIP for the first time period further comprises specifying the first time period on a daily, weekly, monthly, or yearly basis.

3. A method as recited in claim 1, wherein the first pipeline is utilized to perform RIP on a print job of a first type of print data, the different pipeline being utilized to perform RIP on a print job of a second type of print data, the first and second types of print data may be of the same type of PDL.

4. A method as recited in claim 1, further comprising presenting schedules for the first RIP engine with respect to the first and/or other individual ones of the multiple pipelines, the schedules being presented for the user to manipulate respective RIP schedules corresponding to any one or more of the first and/or other individual ones of the multiple pipelines.

5. A method as recited in claim 1, wherein the different pipeline is a default pipeline.

6. A method as recited in claim 1, further comprising: identifying a default pipeline of the multiple RIP pipelines for the RIP engine to perform default RIP; evaluating criteria to determine whether the RIP engine should be transferred from a current pipeline of the multiple pipelines to the default pipeline; and responsive to a positive evaluation of at least one of the criteria, transferring the RIP engine from the current pipeline to the default pipeline for RIP.

7. A method as recited in claim 6, wherein evaluating the criteria further comprise: indicating the positive criteria evaluation when: (a) subsequent to expiration of a time slot scheduling the RIP engine to the current pipeline for RIP, it is determined that the RIP engine is not immediately scheduled to perform RIP on any other pipeline of the multiple RIP pipelines; or (b) a threshold amount of time has passed wherein the RIP engine has remained idle in the current pipeline.

8. A computer-readable medium comprising computer-program instructions executable by a processor for enhancing management of raster image processing (RIP) resources, the computer-executable instructions comprising instructions for:
   scheduling a raster image processor (RIP) engine to perform RIP for a first time period in a first pipeline of multiple RIP pipelines, wherein scheduling of the RIP engine is configurable by a user to define a schedule for automatic assignment at specified times of the RIP engine to various RIP pipelines;
   scheduling the RIP engine to perform RIP for a second time period for a second pipeline of the multiple RIP pipelines, the first time period not overlapping the second time period;
   responsive to occurrence of a start time of the first time period, automatically assigning the RIP engine to the first pipeline for RIP; and
   responsive to occurrence of a start time of the second time period, automatically transferring the RIP engine to the second pipeline for RIP.

9. A computer-readable medium as recited in claim 8, wherein the first pipeline is configured to perform RIP on a print job based on a first set of criteria, and wherein the second pipeline is configured to perform RIP on a print job based on a second set of criteria, and wherein the first and second sets of criteria are not equivalent.

10. A computer-readable medium as recited in claim 9, wherein the first and second criteria are based on one or more of print data type, print job page count, and/or print job size.

11. A computer-readable medium as recited in claim 8, wherein the computer-program instructions for scheduling the RIP engine to perform RIP for at least first and second time periods further comprise instructions for specifying the at least first and/or second time periods on a daily, weekly, monthly, or yearly basis.

12. A computer-readable medium as recited in claim 8, wherein the computer-program instructions for automatically assigning the RIP engine to the second pipeline further comprise instructions for automatically transferring the RIP engine from the first pipeline for insertion into the second pipeline.

13. A computer-readable medium as recited in claim 8, further comprising computer-program instructions for displaying schedules for the first RIP engine with respect to the first and second pipelines, the schedules being displayed in a user interface providing for at least user manipulation of the first and/or second time frames.

14. A computer-readable medium as recited in claim 8, further comprising computer-program instructions executable by the processor for:
   identifying a default pipeline of the multiple RIP pipelines for the RIP engine to perform default RIP:
   evaluating criteria to determine whether the RIP engine should be transferred from a current pipeline of the multiple pipelines to the default pipeline; and
   responsive to a positive evaluation of at least one of the criteria, transferring the RIP engine from the current pipeline to the default pipeline for RIP.

15. A computer-readable medium as recited in claim 14, wherein the computer-program instructions for evaluating the criteria further comprise instructions for:
   indicating a positive criteria evaluation when:
      (a) subsequent to expiration of a time slot scheduling the RIP engine to the current pipeline for RIP, it is determined that the RIP engine is not immediately scheduled to perform RIP on any other pipeline of the multiple RIP pipelines; or (b) a threshold amount of time has passed wherein the RIP engine has remained idle in the current pipeline.

16. In a printing environment including a raster image processor (RIP) engine and multiple RIP pipelines, a system for enhancing management of RIP resources, the system comprising:

means for scheduling the RIP engine to perform RIP for a first time period for a first pipeline of the multiple RIP pipelines, wherein scheduling of the RIP engine is configurable by a user to define a schedule for automatic assignment at specified times of the RIP engine to various RIP pipelines; and means for automatically transferring the RIP engine from a different pipeline of the multiple RIP pipelines to the first pipeline for RIP responsive to occurrence of a start time of the first time period.

17. A system as recited in claim 16, wherein scheduling the RIP engine to perform RIP for the first time period further comprises specifying the first time period on a daily, weekly, monthly, or yearly basis.

18. A system as recited in claim 16, wherein the first pipeline is utilized to perform RIP on a print job of a first type of print data, the different pipeline being utilized to perform RIP on a print job of a second type of print data, the first and second types of print data may be of the same type of PDL.

19. A system as recited in claim 16, further comprising:
means for presenting schedules for the first RIP engine with respect to the first and/or other individual ones of the multiple pipelines, the schedules being presented for the user to manipulate respective RIP schedules corresponding to any one or more of the first and/or other individual ones of the multiple pipelines.

20. A system as recited in claim 16, wherein the different pipeline is a default pipeline.

21. A system as recited in claim 16, further comprising:
means for identifying a default pipeline of the multiple RIP pipelines for the RIP engine to perform default RIP;
means for evaluating criteria to determine whether the RIP engine should be transferred from a current pipeline of the multiple pipelines to the default pipeline; and
means for transferring the RIP engine from the current pipeline to the default pipeline for RIP responsive to a positive evaluation of at least one of the criteria.

22. A system as recited in claim 21, further comprising:
means for indicating the positive criteria evaluation when:
(a) subsequent to expiration of a time slot scheduling the RIP engine to the current pipeline for RIP, it is determined that the RIP engine is not immediately scheduled to perform RIP on any other pipeline of the multiple RIP pipelines; or (b) a threshold amount of time has passed wherein the RIP engine has remained idle in the current pipeline.

* * * * *